United States Patent
Takenaka et al.

(10) Patent No.: US 7,023,653 B2
(45) Date of Patent: Apr. 4, 2006

(54) FLOPPY DISK APPARATUS

(75) Inventors: Seiji Takenaka, Kyoto (JP); Takuya Ishida, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 11/076,306

(22) Filed: Mar. 9, 2005

(65) Prior Publication Data

US 2005/0201004 A1    Sep. 15, 2005

(30) Foreign Application Priority Data

Mar. 11, 2004   (JP)   ............................. 2004-069344

(51) Int. Cl.
*G11B 5/596*   (2006.01)
(52) U.S. Cl. .................... 360/78.13; 318/696
(58) Field of Classification Search ............. None
See application file for complete search history.

(56) References Cited

U.S. PATENT DOCUMENTS

| | | | | |
|---|---|---|---|---|
| 4,489,259 A | * | 12/1984 | White et al. ............... | 318/696 |
| 4,612,588 A | * | 9/1986 | Tsukahara ................ | 360/78.08 |
| 5,264,771 A | * | 11/1993 | Kawauchi ................ | 318/696 |
| 6,057,978 A | * | 5/2000 | Hayakawa ............... | 360/78.13 |
| 2002/0054452 A1 | * | 5/2002 | Kato et al. ............... | 360/78.12 |

FOREIGN PATENT DOCUMENTS

| | | |
|---|---|---|
| JP | 09-261997 | 10/1997 |
| JP | 11-306501 | 11/1999 |
| JP | 2000-311422 | 11/2000 |

* cited by examiner

*Primary Examiner*—Andrew L. Sniezek
(74) *Attorney, Agent, or Firm*—Keating & Bennett, LLP

(57) ABSTRACT

A floppy disk apparatus improves power efficiency and quietness by commencing rotation of a stepping motor in a smooth fashion. The floppy disk apparatus includes an interface control circuit that outputs, in accordance with an instruction from a host apparatus, a first step pulse signal, step pulse period signals that indicate the period of the first step pulse signal and that are output before the first step pulse signal and a direction signal, and a floppy disk control circuit that generates a second step pulse signal delayed by a predetermined time from the first step pulse signal in accordance with the step pulse period signal, that generates a first signal that toggles in synchronization with the first step pulse signal and a second signal that toggles in synchronization with the second step pulse signal, and that outputs the first and second signals as control signals in accordance with the direction signal.

13 Claims, 5 Drawing Sheets

FLOPPY DISK APPARATUS

BACKGROUND OF THE INVENTION

1. Field of the Invention

The present invention relates to a floppy disk apparatus including a stepping motor.

2. Description of the Related Art

In recent years, floppy disk apparatuses that use a USB (Universal Serial Bus) interface instead of the conventional legacy interface as the interface with the host apparatus, such as a personal computer, have become available as commercial products. Such known floppy disk apparatuses are disclosed in, for example, Laid-open Japanese Patent Application No. H. 11-306501 and Laid-open Japanese Patent Application No. 2000-311422. The basic configuration of the known floppy disk apparatuses is as shown in FIG. 3. Specifically, such a floppy disk apparatus 101 includes an interface control circuit 110 that communicates with the host apparatus 2 through a USB, a floppy disk control circuit 111 that receives a control signal, control data or write data from an interface control circuit 110 or sends read data to the interface control circuit 110 and that controls a spindle motor drive circuit 12, a stepping motor drive circuit 14 and a read/write circuit 16 (described subsequently), a spindle motor drive circuit 12 that is controlled by the floppy disk control circuit 111, a spindle motor 13 that is driven by the spindle motor drive circuit 12 so as to rotate the floppy disk, a stepping motor drive circuit 14 that is controlled by the floppy disk control circuit 11, a stepping motor 15 that shifts a magnetic head (described subsequently), driven by the stepping motor drive circuit 14, a read/write circuit 16 that performs input/output of read and write data with the floppy disk control circuit 111 and performs input/output of electrical signals with respect to the magnetic head, and a magnetic head 17 that converts magnetic signals on the floppy disk to electrical signals and converts electrical signals to magnetic signals.

The function of the floppy disk drive controller (FDC), provided in the host apparatus in a conventional legacy interface (such as, for example Laid-open Japanese Patent Application No. H. 9-261997), is incorporated in the interface control circuit 110 in the USB interface floppy disk apparatus 101. Consequently, signals like those of the legacy interface are used between the interface control circuit 110 and the floppy disk control circuit 111.

FIG. 4 shows a circuit block diagram relating to drive and control of a stepping motor 15 used in the floppy disk apparatus 101. The interface control circuit 110 outputs a first step pulse signal STP that constitutes the reference for the rotational speed of the stepping motor 15 and a direction signal DIR that determines the direction of rotation, in accordance with an instruction from the host apparatus 2 (not shown in FIG. 4). The floppy disk control circuit 111 inputs these signals and generates and outputs control signals $a^+$, $a^-$ and $b^+$, $b^-$ that control the stepping motor drive circuit 14. Specifically, the floppy disk control circuit 111 includes a step pulse period detection circuit 111D that detects the period T of the first step pulse signal STP, a second pulse generating circuit 111S that generates a second step pulse signal STP2 from the output signal of the step pulse period detection circuit 111D and the first step pulse signal STP, and a control signal generating circuit 111C that generates the control signals $a^+$, $a^-$ and $b^+$, $b^-$ from the first step pulse signal STP, second step pulse signal STP2 and direction signal DIR.

Next, control of the stepping motor 15 will be described with reference to FIG. 5, which is a waveform diagram of the various signals described above. The first step pulse signal STP has a pulse in the negative direction having a period T that is changed in accordance with an instruction from the host apparatus 2 and is, for example, 5 mS. The second step pulse signal STP2 has a pulse in the negative direction that falls with a delay of a predetermined time after the fall of the first step pulse signal STP. The delay time to of the initial second step pulse signal STP2 is determined under a condition in which the period T of the first step pulse signal STP is not detected and is therefore set to about 1.5 mS, corresponding to the minimum period T of the first step pulse signal STP that can be instructed by the host apparatus 2, to enable rotation of the stepping motor 15. The delay time $t_1$ of the second step pulse signal STP 2 on the second and subsequent occasions is generated directly in response to detection of the period T of the first step pulse signal STP and is ½ of the period T of the first step pulse signal STP (e.g., about 2.5 mS). If the direction signal DIR is low level that indicates the forward rotation, control signals $a^+$, $a^-$ that toggle (repeatedly invert on each pulse) in synchronization with the first step pulse signal STP are generated and control signals $b^+$, $b^-$ that toggle in synchronization with the second step pulse signal STP2 are generated. It should be noted that when rotation is effected in the reverse direction, control signals $b^+$, $b^-$ are generated in synchronization with the first step pulse signal STP and control signals $a^+$, $a^-$ are generated in synchronization with the second step pulse signal STP2.

Thus, since the second and subsequent second step pulse signals STP2 are generated after detection of the period T of the first step pulse signal STP, the delay time $t_1$ is adequate, in accordance with the period T. An adequate delay time is about ½ of the period T so as to achieve smooth rotation of the stepping motor 15. In contrast, since the period T of the initial first step pulse signal STP at which rotation of the stepping motor 15 is commenced cannot be detected, the initial second step pulse signal STP2 is selected to have a delay time to of about 1.5 mS, corresponding to the minimum of the period T of the first step pulse signal STP that can be instructed by the host apparatus 2 to produce some rotation of the stepping motor 15, whatever the period T, even if this rotation is not smooth. Therefore, at this time, power efficiency is lowered and noise is generated since the delay time is inadequate.

SUMMARY OF THE INVENTION

In order to overcome the problems described above, preferred embodiments of the present invention provide a floppy disk apparatus that greatly improves power efficiency and quietness by commencing rotation of the stepping motor in a smooth fashion.

A floppy disk apparatus according to a preferred embodiment of the present invention includes an interface control circuit that outputs, in accordance with an instruction from a host apparatus, a first step pulse signal constituting a reference for the rotational speed of a stepping motor, at least one step pulse period signal that indicates the period of the first step pulse signal and that is output before the first step pulse signal, and a direction signal that determines the direction of rotation of the stepping motor, a floppy disk control circuit that generates a second step pulse signal delayed by a predetermined time from the first step pulse signal in accordance with the step pulse period signal, that generates a first signal that toggles in synchronization with the first step pulse signal and a second signal that toggles in synchronization with the second pulse signal, and that outputs the first and second signals as control signals in accordance with the direction signal, a stepping motor drive circuit that is controlled by the control signals that are output by the floppy disk control circuit, and a stepping motor that is driven by the stepping motor drive circuit to shift a magnetic head.

Preferably, the interface control circuit of this floppy disk apparatus includes at least one step pulse period register and, as the step pulse period signal, data from the step pulse period register is transferred to the floppy disk control circuit.

Preferably, in this floppy disk apparatus at least the interface control circuit and floppy disk control circuit are integrated in a semiconductor integrated device.

In a floppy disk apparatus according to a preferred embodiment of the present invention, the step pulse period signal is arranged to be output from the interface control circuit earlier than the first step pulse signal, so that the floppy disk control circuit can generate the initial second step pulse signal adequately and the power efficiency and quietness can thereby be improved by commencing rotation of the stepping motor in a smooth fashion.

Other elements, characteristics, features, properties, and advantages of the present invention will become clearer from the detailed description of the preferred embodiments of the present invention that is to be described next with reference to the attached drawings.

DETAILED DESCRIPTION OF THE PREFERRED EMBODIMENTS

Figure 1:
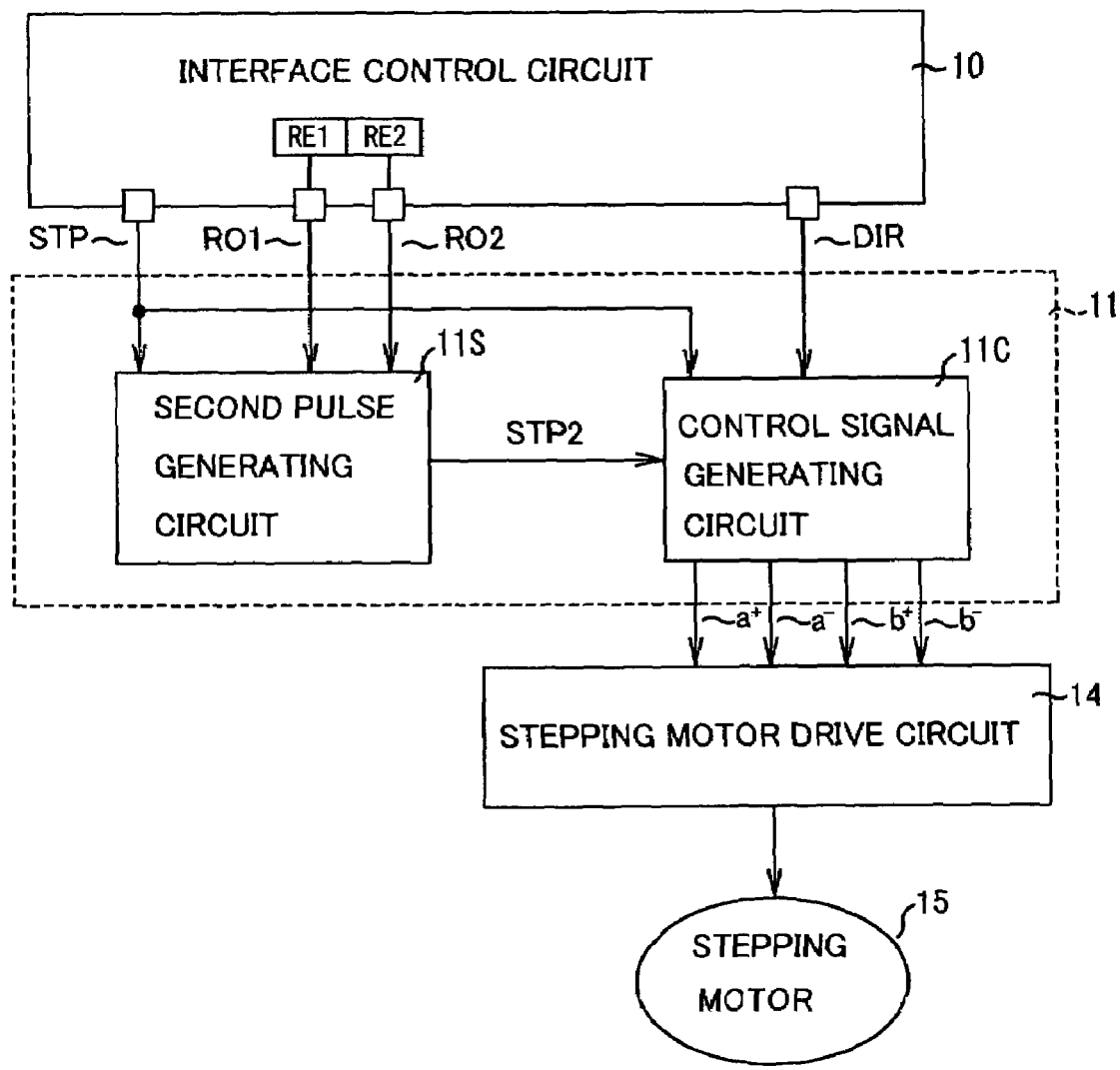
FIG. 1 is a block diagram of a circuit relating to drive and control of a stepping motor in a floppy disk apparatus according to a preferred embodiment of the present invention.
Figure 3:
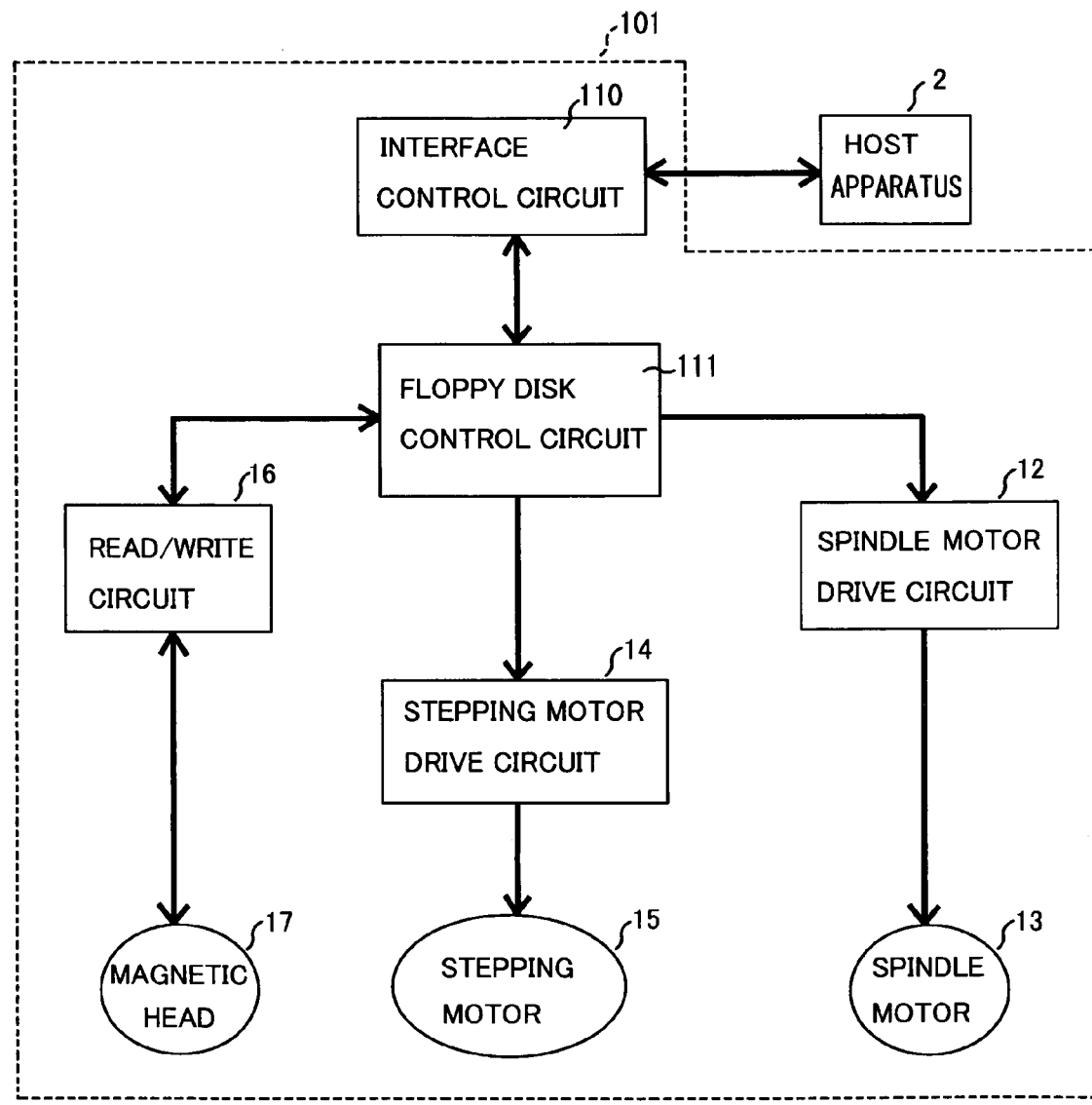
FIG. 3 is an overall block diagram of a floppy disk apparatus according to a related art.
Figure 4:
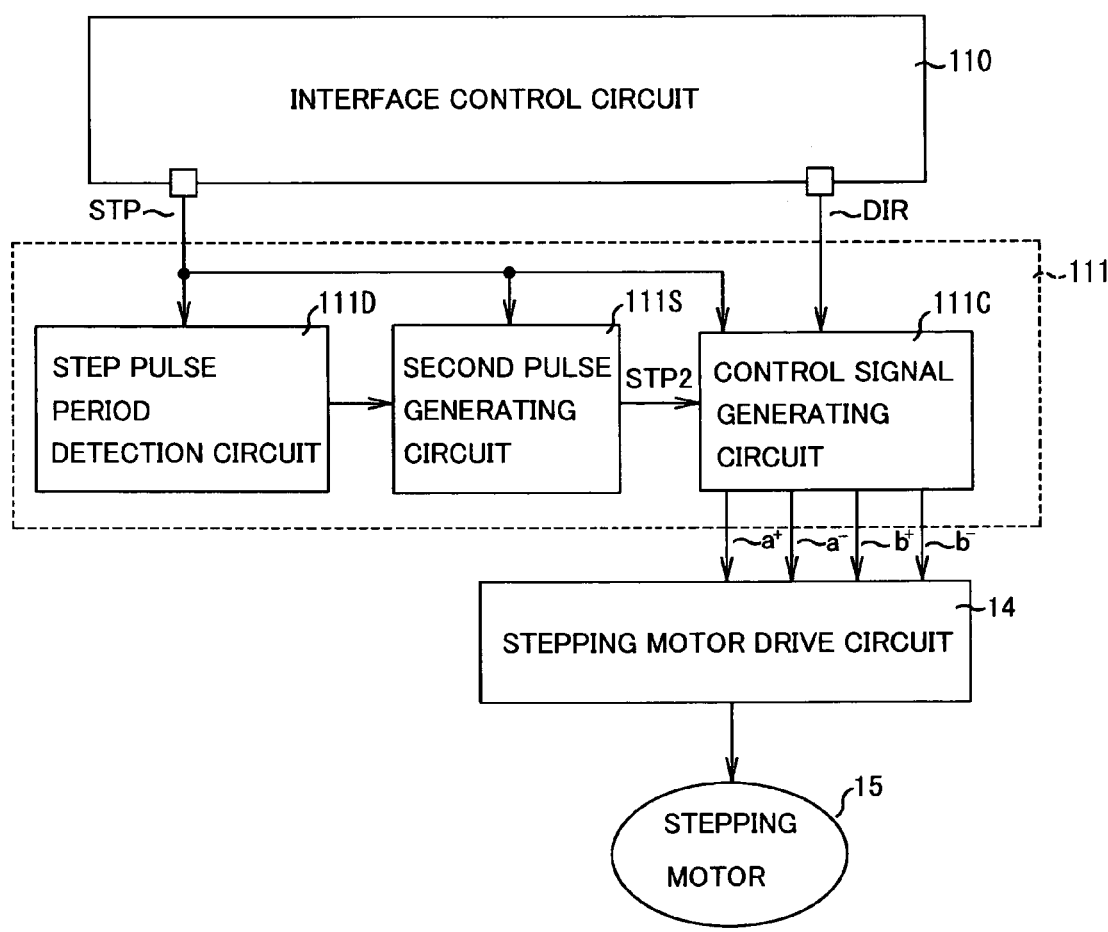
FIG. 4 is a block diagram of a circuit relating to drive and control of a stepping motor in a floppy disk apparatus according to a related art.
Figure 5:
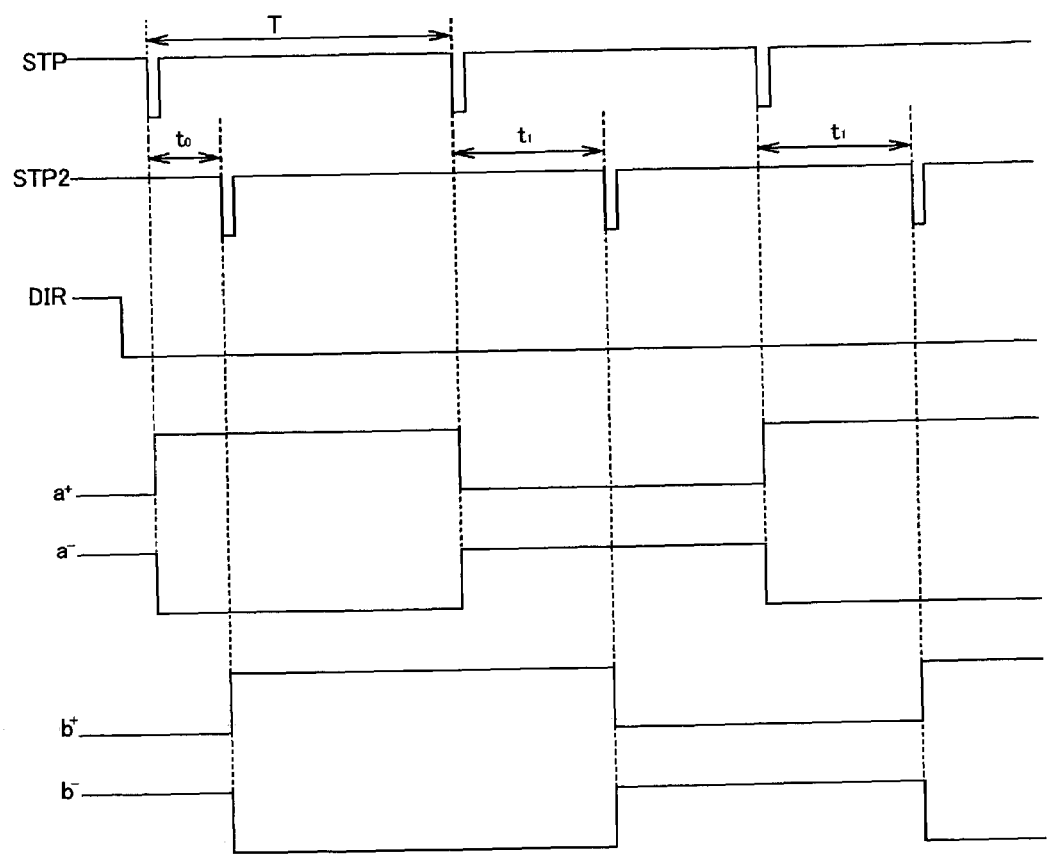
FIG. 5 is a waveform diagram of the various signals thereof.

A floppy disk apparatus of a preferred embodiment of the present invention will be described herein below. The floppy disk apparatus 1 according to a preferred embodiment of the present invention preferably has the same basic construction as the floppy disk apparatus 101 shown in FIG. 3 and includes an interface control circuit 10 and a floppy disk control circuit 11 of special circuit construction instead of the interface control circuit 110 and the floppy disk control circuit 111. Hence, the overall description of the floppy disk apparatus 1 is omitted. FIG. 1 is a block diagram of a circuit relating to drive and control of the stepping motor 15 that is used in this floppy disk apparatus 1. The interface control circuit 10 outputs, in accordance with an instruction from the host apparatus 2 (not shown in FIG. 1), a first step pulse signal STP that provides the reference for the speed of rotation of the stepping motor 15, two step pulse period signals RO1 and RO2 that are output before the first step pulse signal STP and indicate the period of the first step pulse signal STP, and a direction signal DIR that determines the direction of rotation. The floppy disk control circuit 11 generates a second step pulse signal STP2 that is delayed by a predetermined time from the first step pulse signal STP in accordance with the step pulse period signals RO1 and RO2, generates a first signal that toggles (repeatedly inverts on each pulse) in synchronization with the first step pulse signal STP and a second signal that toggles in synchronization with the second step pulse signal STP2 and outputs the first and second signals as control signals $a^+$, $a^-$ and $b^+$, $b^-$, wherein the first and second signals are selected in accordance with the direction signal DIR. The stepping motor drive circuit 14 is controlled by the control signals $a^+$, $a^-$ and $b^+$, $b^-$ that are output by the floppy disk control circuit 11 and the stepping motor 15 is driven by the stepping motor drive circuit 14 to shift a magnetic head 17 (not shown in FIG. 1).

An interface control circuit 10 includes two step pulse period registers RE1, RE2 and corresponding two terminals for outputting the two step pulse period signals RO1 and RO2. The period T of the first step pulse signal STP is changed under the control of an instruction from the host apparatus 2. In this floppy disk apparatus 1, the period T of the first step pulse signal STP is classified as one or other of the four periods of about 3 mS, about 4 mS, about 5 mS or about 6 mS. The results of this classification are then stored in the two step pulse period registers RE1 and RE2.

The floppy disk control circuit 11 includes a second pulse generating circuit 11S that generates a second step pulse signal STP2 from the first step pulse signal STP in accordance with the step pulse period signals RO1 and RO2 and a control signal generating circuit 11C that generates control signals $a^+$, $a^-$ and $b^+$, $b^-$ from the first step pulse signal STP, second step pulse signal STP2 and direction signal DIR. The second pulse generating circuit 11S determines the delay time $t_1$ from the first step pulse signal STP up to the second step pulse signal STP2 in accordance with the step pulse period signals RO1 and RO2. Specifically, corresponding to the classification of the period T of the first step pulse signal STP as about 3 mS, about 4 mS, about 5 mS or about 6 mS, this delay time $t_1$ is about 1.5 mS, about 2 mS, about 2.5 mS or about 3 mS.

Figure 2:
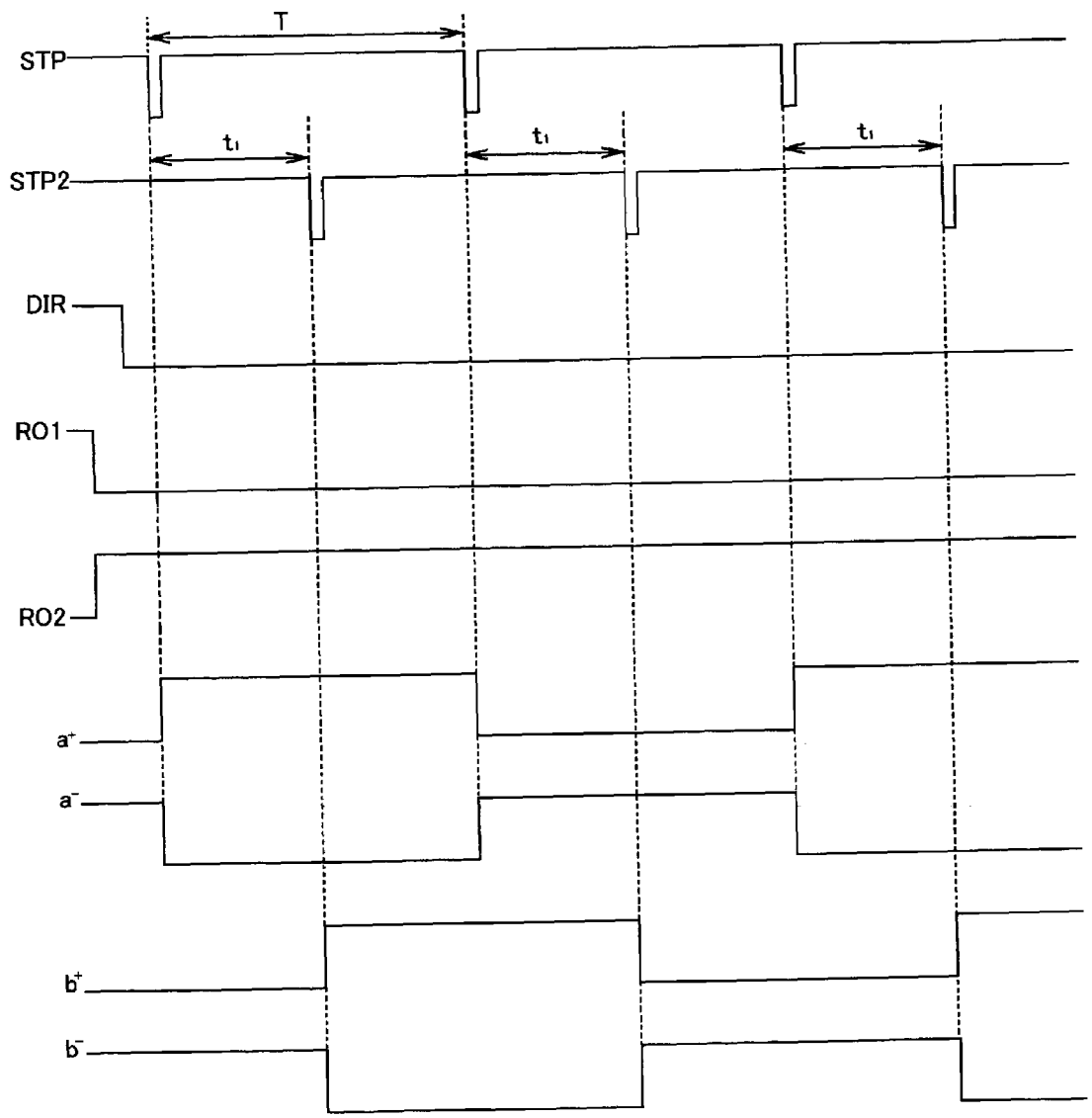
FIG. 2 is a waveform diagram of the various signals thereof.

Next, control of the stepping motor 15 in the case of a period T of, for example, about 5 mS will be described with reference to FIG. 2. In the interface control circuit 10, before the first step pulse signal STP is output, for example data '0' and '1' are respectively written to the step pulse period registers RE1 and RE2, matching the period of the 5 mS step pulse. The step pulse period signal RO1 of '0' and the step pulse period signal RO2 of '1' corresponding thereto are then output and the direction signal DIR is also output. Next, the first step pulse signal STP for commencement of rotation of the stepping motor 15 is output. Then, in the floppy disk control circuit 11, a second step pulse signal STP2 of delay time $t_1$, which is about 2.5 mS, corresponding to the step pulse period signals RO1 and RO2 is generated. Consequently, in the case where the direction signal DIR is low level that indicates, for example, the rotation in the forwards direction, the control signals $a^+$, $a^-$ are output in synchronization with the first step pulse signal STP and the control signals $b^+$, $b^-$ are output in synchronization with the second step pulse signal STP2. Also, in the case of rotation in the reverse direction, the direction signal DIR is high level, then, the control signals $b^+$, $b^-$ are output in synchronization with the first step pulse signal STP and the control signals $a^+$, $a^-$ are output in synchronization with the second step pulse signal STP2.

Consequently, by inputting step pulse period signals RO1, RO2 indicating the period T of the first step pulse signal STP before reception of the first step pulse signal STP for commencement of rotation of the stepping motor 15, the floppy disk control circuit 11 can generate a suitable second step pulse signal STP2 even when the first step pulse signal STP is the initial first step pulse signal STP. As a result, in the floppy disk apparatus 1, rotation of the stepping motor 15 can be commenced in a smooth fashion, resulting in improved power efficiency and quietness.

It should be noted that the number of classifications of the period T of the first step pulse signal STP is not restricted to four and could be increased or decreased. In this case, the number of step pulse period signals and step pulse period registers will be different.

Also, as the output of the step pulse period signal, it is possible to lead the internal bus of the interface control circuit 10 to the outside and use this to transfer data from the step pulse period register to the second pulse generating circuit 11S of the floppy disk control circuit 11. In this case, the number of signal lines between the interface control circuit 10 and the floppy disk control circuit 11 is increased, but this is effective not only for controlling the stepping motor 15 but also for increasing the fineness of control between the interface control circuit 10 and the floppy disk control circuit 11.

Also, expansion of the printed circuit board due to an increase in the number of signal lines such as the step pulse period signals RO1, RO2 can be prevented by integrating the interface control circuit 10 and the floppy disk control circuit 11 in a semiconductor integrated device, thereby achieving space-saving and cost-reduction. Also, recently, a semiconductor integrated device (three-in-one chip), in which three main circuits, namely, the floppy disk control circuit, stepping motor drive circuit and read/write circuit are integrated, have become available as commercial products and it is also possible to further integrate the interface control circuit 10 with a three-in-one chip including a floppy disk control circuit 11.

It should be noted that the present invention is not restricted to the preferred embodiment described above and various design modifications are possible within the scope of the appended claims.

What is claimed is:

1. A floppy disk apparatus comprising:
    an interface control circuit that outputs, in accordance with an instruction from a host apparatus, a first step pulse signal constituting a reference for the rotational speed of a stepping motor, at least one step pulse period signal that indicates the period of the first step pulse signal and that is output before the first step pulse signal, and a direction signal that determines the direction of rotation of the stepping motor;
    a floppy disk control circuit that generates a second step pulse signal delayed by a predetermined time from the first step pulse signal in accordance with the step pulse period signal, that generates a first signal that toggles in synchronization with the first step pulse signal and a second signal that toggles in synchronization with the second step pulse signal, and that outputs the first and second signals as control signals in accordance with the direction signal;
    a stepping motor drive circuit that is controlled by the control signals that are output by the floppy disk control circuit; and
    a stepping motor that is driven by the stepping motor drive circuit to shift a magnetic head.

2. The floppy disk apparatus according to claim 1, wherein the interface control circuit includes at least one step pulse period register and, as the step pulse period signal, data from the step pulse period register is transferred to the floppy disk control circuit.

3. The floppy disk apparatus according to claim 2, wherein data from the step pulse period register is transferred to the floppy disk control circuit through at least one terminal corresponding to the step pulse period register.

4. The floppy disk apparatus according to claim 2, wherein data from the step pulse period register is transferred to the floppy disk control circuit using an internal bus.

5. The floppy disk apparatus according to claim 2, wherein the interface control circuit includes two step pulse period registers in which the results of a classification of the period of the first step pulse signal among values of about 3 ms, about 4 ms, about 5 ms and about 6 ms are stored.

6. The floppy disk apparatus according to claim 5, wherein said predetermined time of delay from the first step pulse signal to the generating of the second step pulse signal is determined in accordance with the classification of the period of the first step pulse signal such that for the period of about 3 mS, said predetermined time of delay is about 1.5 mS; for the period of about 4 mS, said predetermined time of delay is about 2 mS; for the period of about 5 mS, said predetermined time of delay is about 2.5 mS; and for the period of about 6 mS, said predetermined time of delay is about 3 mS.

7. The floppy disk apparatus according to claim 1, wherein at least the interface control circuit and the floppy disk control circuit are integrated in a semiconductor integrated device.

8. The floppy disk apparatus according to claim 7, wherein a stepping motor drive circuit and read/write circuit are also integrated in the semiconductor integrated device.

9. The floppy disk apparatus according to claim 2, wherein at least the interface control circuit and the floppy disk control circuit are integrated in a semiconductor integrated device.

10. The floppy disk apparatus according to claim 9, wherein a stepping motor drive circuit and read/write circuit are integrated in the semiconductor integrated device.

11. The floppy disk apparatus according to claim 1, wherein the step pulse period signal is output before the first step pulse signal and is used to indicate the period of the first step pulse signal.

12. The floppy disk apparatus according to claim 11, wherein the floppy disk control circuit includes a second pulse generating circuit that generates the second step pulse signal from the first step pulse signal in accordance with the step pulse period signal.

13. The floppy disk apparatus according to claim 11, wherein said predetermined time of delay from the first step pulse signal to the generating of the second step pulse signal is determined in accordance with the step pulse period signal.

* * * * *